(No Model.)
G. H. F. SCHRADER.
VALVE FOR PNEUMATIC TIRES.
No. 473,673. Patented Apr. 26, 1892.
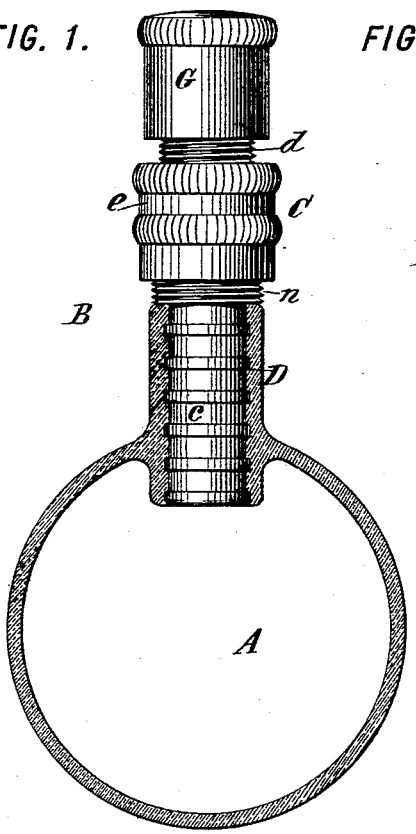
FIG. 1.
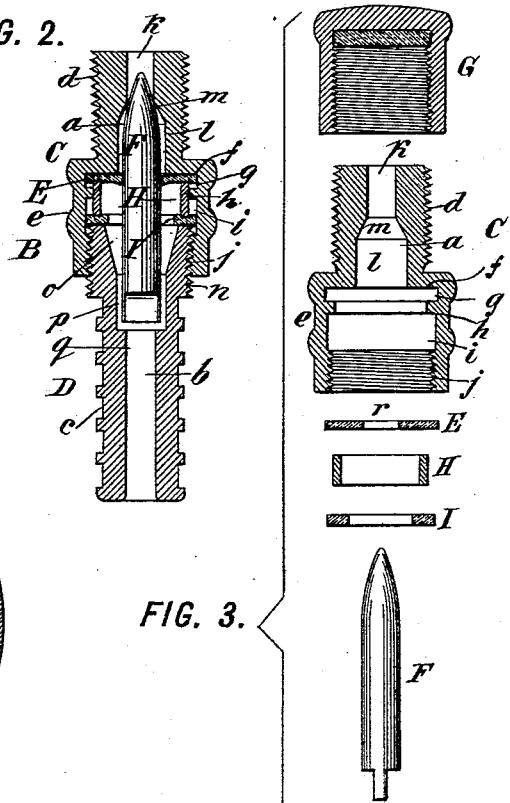
FIG. 2.
FIG. 3.
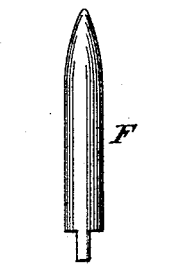
FIG. 4.
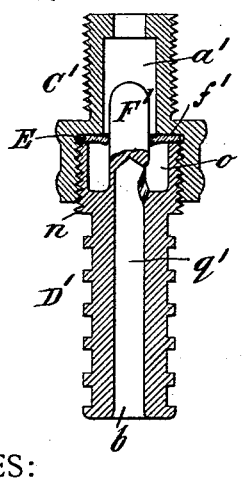
FIG. 5.
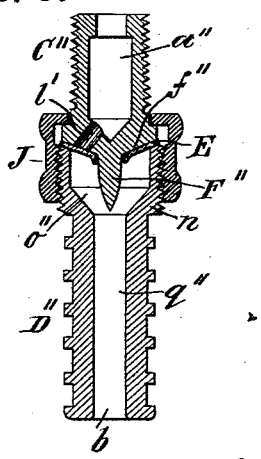
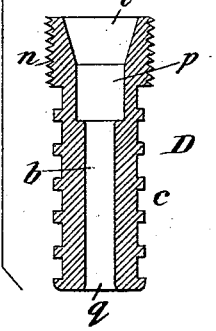
WITNESSES:
John Becker
Fred White
INVENTOR:
George H. F. Schrader,
By his Attorneys,
Arthur E. Dresen & Co.
THE NORRIS PETERS CO., PHOTO-LITHO., WASHINGTON, D. C.

United States Patent Office.

GEORGE H. F. SCHRADER, OF NEW YORK, N. Y.

VALVE FOR PNEUMATIC TIRES.

SPECIFICATION forming part of Letters Patent No. 473,673, dated April 26, 1892.

Application filed February 17, 1892. Serial No. 421,849. (No model.)

*To all whom it may concern:*

Be it known that I, GEORGE H. F. SCHRADER, a citizen of the United States, residing in the city, county, and State of New York, have invented certain new and useful Improvements in Valves for Pneumatic Bicycle-Tires and for other Purposes, of which the following is a specification.

This invention relates especially to air-valves for pneumatic tires of bicycles, although it may be advantageously employed for other purposes.

Various constructions of valves for pneumatic tires have heretofore been employed; but great difficulty has been experienced with these in practice by reason of the delicacy of certain of the parts and the peculiar influences due to the vibration of the tire in use and the sudden variations in pressure of the air therein. In this class of valve an air-pump is usually coupled to the valve by a screw-thread connection for forcing air through it and into the hollow tire, and an elastic tube is provided which permits the entrance of air, but collapses to prevent its escape. In practice such tubes have been found to soon become expanded or distorted or to collect oil or dirt from the air-pump, and as a result to permit leakage, consequently rendering frequent cleaning or renewal of parts necessary.

My invention aims to provide a simple, cheap, and durable valve which will be efficient in operation and easy of manipulation.

To this end, in carrying out the preferred form of my invention, I construct the valve with a casing having an induction-conduit, a perforated disk interrupting said conduit, a casing having an eduction-conduit coupled to said first-mentioned casing and when so coupled securing said disk over the conduit therein by a leak-tight joint surrounding said conduit, and an imperforate plug passing through the perforation of said disk and closing the latter, all as will be more fully hereinafter set forth.

In the accompanying drawings, which illustrate my invention, Figure 1 is a side elevation of the preferred form of my improved valve attached to a bicycle-tire shown in section. Fig. 2 is an axial section of the valve shown in Fig. 1. Fig. 3 is a view showing in axial section, but detached from each other, the various parts of the valve shown in Fig. 1. Fig. 4 is an axial section of a modification of my invention, and Fig. 5 is a similar section of another modification.

Referring to the drawings, let A indicate the hollow tire or other hollow vessel, and B the valve therefor, which may be attached thereto in any known manner.

In Fig. 1 the tire A is shown as made of rubber, which is welded around a portion of the valve-casing adapted for such a connection, as heretofore.

In the preferred form of my invention, as shown in Figs. 1, 2, and 3, the valve B consists of an outer or induction casing C, having an induction-conduit $a$, an eduction-casing D, constructed to be coupled to the casing C and having an eduction-conduit $b$ and a roughened external portion $c$, to which the rubber of the tire may be welded, a flexible disk E, clamped between said casings to interrupt said conduit, with a leak-tight joint surrounding the latter, but left free within said joint and perforated at its free portion, and an imperforate plug F, passing through the perforation in the disk E. Preferably the casing C is constructed with a screw-threaded outer end $d$, onto which an air-pump may be connected for forcing air through the valve and onto which, when the valve is not connected to the air-pump, a dust-cap G is screwed, as shown in Fig. 1, for protection, and below this outer end the casing C is constructed with an enlarged portion $e$, milled externally for convenience in handling, and having a hollow interior for receiving the valve-disk E. Preferably the hollow interior of the casing C is constructed with a substantially flat seat $f$, an annular recess $g$ surrounding said seat, an annular rib $h$ beyond said recess, a second annular recess $i$ beyond said rib, and internal screw-threads $j$ beyond said second recess, as best seen in Figs. 2 and 3.

The induction-conduit $a$ within the casing C preferably consists of a contracted inlet-opening $k$, an enlarged cylindrical portion $l$, extending from the seat $f$ toward the inlet $k$, and a beveled annular seat $m$, connecting the inlet $k$ with the enlarged opening $l$.

The eduction-casing D is preferably constructed with an enlarged exteriorly-screw-threaded end n, adapted to engage with the screw-thread j of the casing C, and when screwed therein to couple the casings together, and its air-conduit preferably consists of an enlarged chamber o, a smaller chamber p, connecting therewith, and a still smaller outlet q, leading from the chamber p through the casing.

The flexible disk E is preferably constructed of rubber or other flexible or elastic material, and is preferably a substantially flat disk adapted to seat against the seat f within the annular recess g of the casing C. The disk E has a free central portion interrupting the induction-conduit and a perforation r through its free portion. The disk E is clamped in position against the seat f around its outer portion in such manner that it has a leak-tight joint with said seat around the induction-conduit. The disk E is preferably clamped in position by reason of the coupling together of the two casings, and I prefer to clamp it in the manner shown in Fig. 2. In this construction an annular metallic ring H is placed within the casing C against the eduction side of the disk E, which ring is preserved in position by the rib or flange h, and a packing-ring I, preferably of rubber, is then inserted within the casing C against the ring H and between it and the end n of the casing D, whereby when the latter is screwed into the casing C its end n forces the packing-ring I against the ring H and the latter against the outer portion of the disk E, which disk is thereby compressed between the ring H and the seat f, and a leak-tight joint is thus made surrounding the induction air-conduit. This arrangement is advantageous, also, in that the pressure on the disk to make this joint is exerted solely within the outer periphery thereof, whereby the distortion of the disk under this pressure may take place outwardly within the annular cavity g, and the liability of inward distortion or of any portion of the edge of the disk slipping inwardly of the ring H (as would be the case were the disk clamped at its edge) is avoided. The ring H, being of thin metal, also affords an enlarged space for the flexure of the free portion of the disk within the ring in operation. The packing-ring I is also clamped near its surface center between the ring H and the end n of the casing D, and hence under the pressure it sustains it expands exteriorly of the ring H into the annular recess i, as well as expanding internally, thus insuring against its springing internally during the coupling operation, which would cause a defective joint.

The plug F should be imperforate, in that there should be no communication through the plug from the induction to the eduction conduits. I prefer to construct it, as shown in Figs. 2 and 3, as a solid loose plug passing through, but slightly larger than, and closing the perforation r in the disk E. Preferably it extends into the induction-conduit a, partially filling the portion l thereof, whereby the passage through this portion consists of an annular space at the point where it meets the seat f, which annular space is preferably of less width than the thickness of the disk E, and is interrupted by the latter between the seat f and the periphery of the plug F. Preferably the outer end of the plug F is beveled or tapered to seat against the beveled seat m in the conduit a, whereby when the plug is so seated, as it will normally be by reason of the pressure on the interior of this seat, it will serve both as an auxiliary valve to prevent the escape from within and as a gate or stop to prevent the inward passage of dust or grit. Preferably the plug F extends through the air-space at the eduction side of the disk and into the space p within the casing D, where the end of the plug is cut away, as shown, or otherwise constructed to permit a flow past its end. The inward movement of the plug is limited by its end striking the shoulder between the passage p and the passage q within the casing D.

In operation, when the valve is constructed as shown in Fig. 2, the parts normally rest as shown in that figure; but when the air is forced into the valve the plug F first yields inwardly until its inward end can move no farther, and then the air forces inwardly the free portion of the disk E and extends its perforation r, passing between the latter and the periphery of the plug, flowing through the enlarged air-chamber beneath the disk, through the chambers o and p, around the end of the plug F, and through the passage q into the tire A. As soon as the inward current ceases the pressure from within forces the plug F against its seat m and the disk E against its seat f, its free portion being forced tightly against the periphery of the plug F and toward the annular passage at the termination of the induction-conduit a, where it is forced so tightly as to prevent leakage. The free portion of the disk, when the plug is inserted, is flexed slightly inwardly by reason of the relative size of the plug, and this flexure is preserved on the inward side, since with each inward flow the tendency is to flex the disk in that direction, and by reason of the narrowness of the annular induction-passage the reverse flexure of the disk is prevented. To deflate the tire, it is only necessary to slightly loosen the coupling connection between the two casings, whereby the confined air will quickly pass around the packing-washer I and out between the screw-threads j, as heretofore, while as soon as the coupling is tightened this avenue of escape will be closed and the valve can be used when the tire is to be again inflated.

Should oil, dust, or grit enter the valve its operation will not be interfered with, since if the foreign matter were not driven past the disk with an inflowing current the pressure at the actual surfaces of contact would be so great nd the surfaces in contact would be so small that a tight joint would be made in case the foreign matter lodged on the surfaces.

It will be understood that my invention is not limited to the exact construction of details hereinbefore set forth, and that these may be modified as the judgment of those skilled in the art may dictate without departing from its essential features; also, that certain of the features of my invention may be availed of independently of other features thereof.

Fig. 4 shows a modification embodying certain features of my invention. In this construction the induction-casing C' has a seat f', against which the disk E is clamped directly by the upper end n of the eduction-casing D', and the plug F' is carried by and constructed as a part of the casing D', projecting therefrom through the perforation in the disk E and into the air-conduit a' in the casing C'. The passage q' through the casing D' extends into the base of the plug F', where it communicates with the air-space o' at the eduction side of the disk.

Fig. 5 shows another modified construction in which the coupling J is used to clamp the casings C'' and D'' together, the disks E being clamped directly between the seat f'' of the casing C'' and the end n of the casing D''. In this construction the plug F'' is shown as part of the casing C'' and projecting from the face thereof through the perforation in the disk E. The seat f'' in this instance is shown as slightly coned, and a passage l' is shown as communicating between the induction-conduit a'' and the seat f''. The casing D'' has the internal passage q'' communicating with the enlarged chamber o'' at the eduction side of the disk E, within which chamber the plug F'' projects.

What I claim is, in valves, the following-defined novel features and combinations, substantially as hereinbefore set forth, namely:

1. In a valve, a casing having a conduit, in combination with a flexible disk inclosed therein to interrupt said conduit, having a leak-tight joint with said casing around its outer portion, but left free at its center and perforated at its free portion.

2. In a valve, the casing, in combination with a perforated flexible disk inclosed therein and an imperforate plug passing through the perforation in said disk.

3. In a valve, a casing having a conduit, in combination with a flexible disk inclosed therein to interrupt said conduit, having a leak-tight joint with said casing around its outer portion, but left free at its center and perforated at its free portion, and an imperforate plug passing through the perforation in said disk and movable independently of said casing.

4. In a valve, a casing having a conduit, a flexible perforated disk in said casing and interrupting said conduit, and a plug passing through said disk and partially filling said conduit at the induction side of the valve, substantially as and for the purpose set forth.

5. In a valve, the combination, with an induction-casing having a conduit and a seat, of a perforated flexible disk interrupting said conduit and acting against said seat, and an eduction-casing having a conduit adapted to be coupled to said induction-casing and constructed when coupled thereto to clamp said disk to said seat with a tight joint exteriorly of said conduit, substantially as and for the purpose set forth.

6. In a valve, the induction-casing C, the perforated disk E, the casing D, and the plug F, combined substantially as and for the purpose set forth.

7. In a valve, the casing C, the perforated disk E, the ring H, the packing-ring I, and the casing D, combined substantially as and for the purposes set forth.

8. In a valve, the casing C, having seats f and m, the disk E against said seat f, and the plug F, passing through the disk E and acting on the seat m, combined substantially as and for the purposes set forth.

In witness whereof I have hereunto signed my name in the presence of two subscribing witnesses.

GEORGE H. F. SCHRADER.

Witnesses:
GEORGE H. FRASER,
CHARLES K. FRASER.